(12) United States Patent
Törnquist

(10) Patent No.: US 12,449,056 B2
(45) Date of Patent: Oct. 21, 2025

(54) VALVE CONTROL DEVICE

(71) Applicant: Norden Machinery AB, Kalmar (SE)

(72) Inventor: Mats Törnquist, Kalmar (SE)

(73) Assignee: Norden Machinery AB, Kalmar (SE)

( * ) Notice: Subject to any disclaimer, the term of this patent is extended or adjusted under 35 U.S.C. 154(b) by 0 days.

(21) Appl. No.: 18/705,959

(22) PCT Filed: Oct. 24, 2022

(86) PCT No.: PCT/SE2022/050970
§ 371 (c)(1),
(2) Date: Apr. 29, 2024

(87) PCT Pub. No.: WO2023/075662
PCT Pub. Date: May 4, 2023

(65) Prior Publication Data
US 2024/0418293 A1    Dec. 19, 2024

(30) Foreign Application Priority Data

Nov. 1, 2021    (SE) .................................... 2151342-9

(51) Int. Cl.
*F16K 31/04*    (2006.01)
*F16K 31/52*    (2006.01)
*F16K 31/528*   (2006.01)

(52) U.S. Cl.
CPC .......... *F16K 31/043* (2013.01); *F16K 31/522* (2013.01); *F16K 31/5284* (2013.01)

(58) Field of Classification Search
CPC ... F16K 31/043; F16K 31/522; F16K 31/5284
See application file for complete search history.

(56) References Cited

U.S. PATENT DOCUMENTS 2,531,679 A * 11/1950 Glos .................... F16K 11/056
                                                137/625.11
2,892,352 A     6/1959 Bartlett
(Continued)

FOREIGN PATENT DOCUMENTS

CH          148577 A *  7/1931  ........... F16K 31/043
CN       204628763 U    9/2015
(Continued)

OTHER PUBLICATIONS

Translation of CH 148577 (Year: 1931).*
(Continued)

*Primary Examiner* — Umashankar Venkatesan
(74) *Attorney, Agent, or Firm* — Knobbe, Martens, Olson & Bear, LLP

(57) ABSTRACT

A valve control device for controlling the opening and closing of a valve, including a first control arm and a second control arm, wherein the first control arm is arranged to rotate around a first axis at a first end, wherein the second control arm is arranged to rotate around a second axis at a first end, wherein the first axis is perpendicular to the second axis, and wherein the interface between the first control arm and the second control arm includes a fork and a rotatable member, and wherein the centre axis of the rotatable member is parallel to the upper bearing surface and the lower bearing surface of the fork. The advantage is that the wear of the rotatable member is reduced.

7 Claims, 5 Drawing Sheets

(56) References Cited

U.S. PATENT DOCUMENTS

| | | | | |
|---|---|---|---|---|
| 3,999,573 | A | * | 12/1976 | Austin .................. F16K 31/52 |
| | | | | 137/614.11 |
| 4,149,561 | A | * | 4/1979 | Dalton ................ F16K 31/502 |
| | | | | 74/89.45 |
| 4,651,583 | A | | 3/1987 | Suzuki |
| 4,691,584 | A | * | 9/1987 | Takaishi .................. F16C 1/18 |
| | | | | 292/201 |
| 4,691,585 | A | | 9/1987 | Gottfried |
| 4,704,912 | A | * | 11/1987 | Payne ................ F16H 25/2021 |
| | | | | 74/89.23 |
| 5,085,401 | A | * | 2/1992 | Botting ................ F16K 31/522 |
| | | | | 74/89.32 |
| 5,647,247 | A | | 7/1997 | Magrini |
| 9,634,541 | B2 | * | 4/2017 | Jackson ................ F16D 49/16 |
| 10,004,529 | B2 | * | 6/2018 | Stokes ............ A61B 17/320092 |
| 10,012,187 | B1 | * | 7/2018 | Griffin ............ F02M 35/10255 |
| 10,024,438 | B2 | * | 7/2018 | Misumi ................ F16K 1/2028 |
| 10,323,759 | B2 | * | 6/2019 | Tanner .................. F16K 1/205 |
| 11,015,728 | B2 | * | 5/2021 | Spickard ............ F16K 31/043 |
| 2012/0255379 | A1 | | 10/2012 | Lim et al. |
| 2014/0254965 | A1 | | 9/2014 | Giegel et al. |
| 2015/0226111 | A1 | | 8/2015 | Navarro |

FOREIGN PATENT DOCUMENTS

| | | | |
|---|---|---|---|
| CN | 207634789 U | | 7/2018 |
| CN | 214222065 U | | 9/2021 |
| DE | 202019107104 U1 | * | 2/2020 ............ F16K 37/00 |
| GB | 869949 A | | 6/1961 |
| JP | 52127174 U | | 9/1977 |
| JP | 59122929 U | | 8/1984 |

OTHER PUBLICATIONS

Translation of DE 202019107104 (Year: 2020).*
International Search Report issued in International Application No. PCT/SE2022/050970, mailed on Dec. 7, 2022.
Office Action issued in Swedish Application No. 2151342-9, dated Jun. 1, 2022.

* cited by examiner

VALVE CONTROL DEVICE

TECHNICAL FIELD

The present invention relates to a valve control device adapted to open and close a rotatable valve, such as a ball valve or a plug valve. The device is adapted to provide a removable interface between a first valve arm and a second valve arm with reduced wear. The device is to be used when filling a product, e.g. a paste, into a container.

BACKGROUND ART

The use of filling machines for introducing a substances into a tube or container are well known in the art. One area in which the use of this type of filling machines is particularly common is that of toothpaste which is to be introduced into tubes. When filling toothpaste and similar products which contain relatively highly viscous pastes and creams into tubes and containers, it is important that the right amount of paste is introduced into the container. If the amount is too small, the tube has to be scrapped. If the amount is to large, the tube may have to be scrapped, or too much paste is given away. If the amount is much too large, it may not be possible to close the tube in a proper way.

It is thus important that the right amount of paste is introduced into the tube. To control the introduced amount of a product, a piston pump is used. A valve in the pump is opened to the product inlet when the piston sucks in the product. The valve is rotated such that it is opened to the pump outlet and the filling nozzle when the piston starts to push out the product. In the food industry, there are high cleanliness requirements to follow. In order to be able to clean the pump, which is in contact with the paste, it is of advantage that the pump can be removed from the drive unit in a quick and easy way, such that the pump can be properly cleaned and be repositioned.

In order to be removable, the interface between the motor arm and the valve arm contains a fork and a rotatable ball, where the ball is held between the teeth of the fork. FIGS. 4 and 5 show an example of such a known interface solution. Since the movement of the fork moves along a radius in one plane, and the ball moves along a radius in a perpendicular plane, the ball will both roll and glide against the bearing surfaces of the fork. The ball will roll around the attachment axis of the ball, and will glide in the plane of the motor arm.

One problem with this solution is that the bearing surfaces between the teeth of the fork and the ball will wear with time. The motor arm moves with a motor in a plane perpendicular to the motor axis. The end of the motor arm, where the fork is positioned, moves along a radius in that plane. The ball moves along a radius in a plane perpendicular to the plane of the motor arm, since the valve is a rotational valve that opens and closes with a rotational movement. When the bearing surfaces are worn, the precision of the opening and closing action will deteriorate, and the amount of paste may start to differ. The wear may also introduce vibrations. In clean rooms, e.g. when filling medical pastes, wear particles may contaminate the air and the paste. The components of the interface must thus be controlled and replaced relatively often.

There is thus room for an improved valve control device.

DISCLOSURE OF INVENTION

An object of the invention is to provide an improved valve control device for a filling valve. The solution to the problem according to the invention is described in the characterizing part of claim 1 regarding the valve control device. The other claims contain advantageous further developments of the valve control device.

In a valve control device for controlling the opening and closing of a valve, comprising a first control arm and a second control arm, where the first control arm is arranged to rotate around a first axis at a first end, where the second control arm is arranged to rotate around a second axis at a first end, where the first axis is perpendicular to the second axis, where a second end of the first control arm is provided with a fork having an upper bearing surface and a lower bearing surface, where a second end of the second control arm is provided with a rotatable member, where the rotatable member is rotatable around a centre axis, and where the rotatable member is attached to the second control arm on a mounting surface, the object of the invention is achieved in that the a plane of the mounting surface is angled with respect to a plane of the second control arm that is perpendicular to the second rotational axis such that the centre axis of the rotatable member is parallel to the upper bearing surface and the lower bearing surface of the fork during movement of the first control arm relative to the second control arm.

By this first embodiment of a feeding device according to the invention, a valve control device is provided, in which the wear in the interface between a first control arm and a second control arm is reduced. The rotatable member of the interface is mounted on the second control arm such that the centre axis of the rotatable member is parallel to the upper bearing surface and the lower bearing surface of the first control arm. This will allow the rotatable member to rotate when the first and second control arm moves and opens and closes a valve. This will reduce wear of the interface, and will reduce the amount of wear particles created by the wear. The valve control device forms part of a tube filling machine, e.g. used to fill toothpaste into toothpaste tubes.

BRIEF DESCRIPTION OF DRAWINGS

The invention will be described in greater detail in the following, with reference to the embodiments that are shown in the attached drawings, in which.

MODES FOR CARRYING OUT THE INVENTION

The embodiments of the invention with further developments described in the following are to be regarded only as examples and are in no way to limit the scope of the protection provided by the patent claims.

Figure 1:
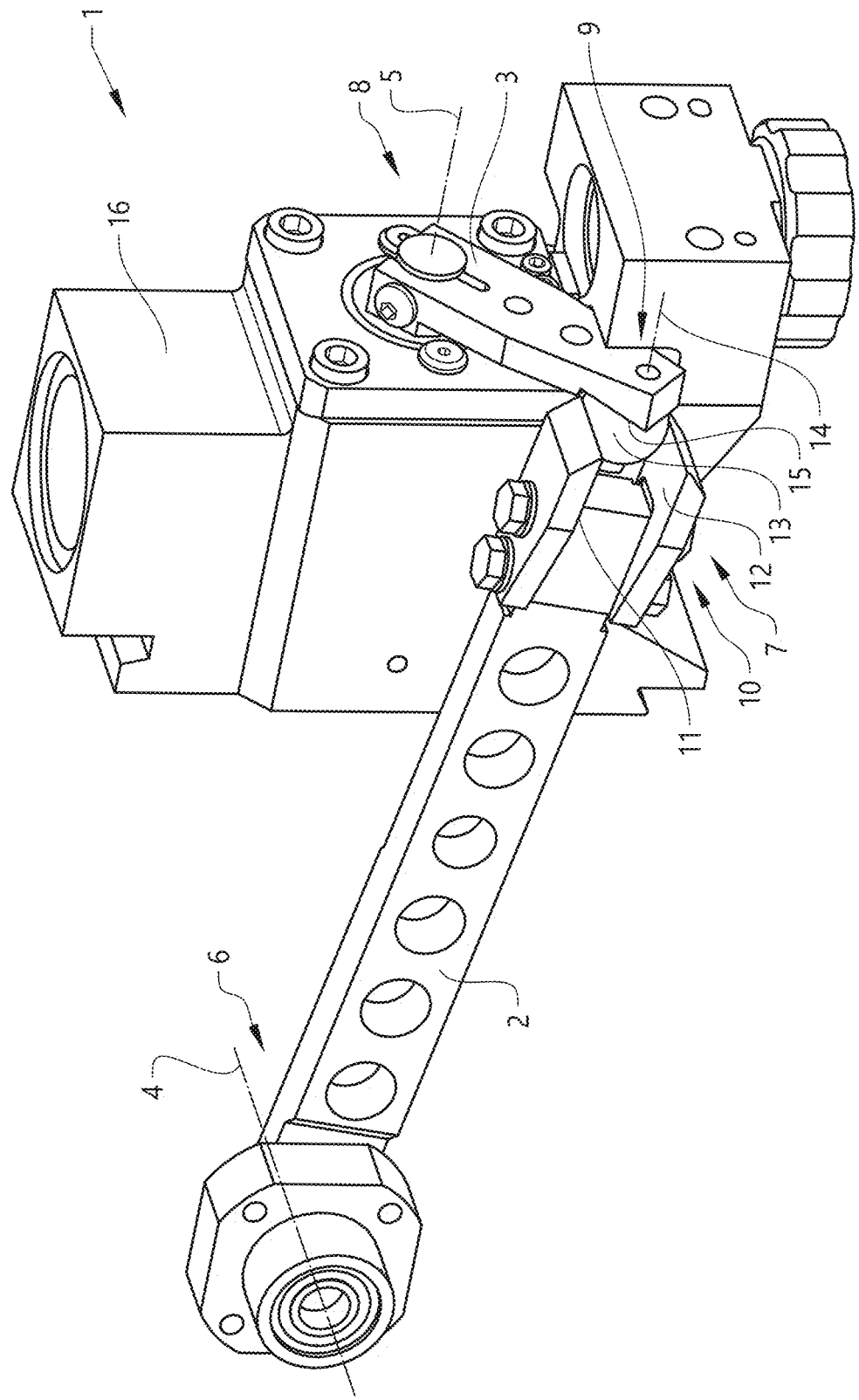
FIG. 1 shows a view of a valve control device according to the invention.
Figure 2:
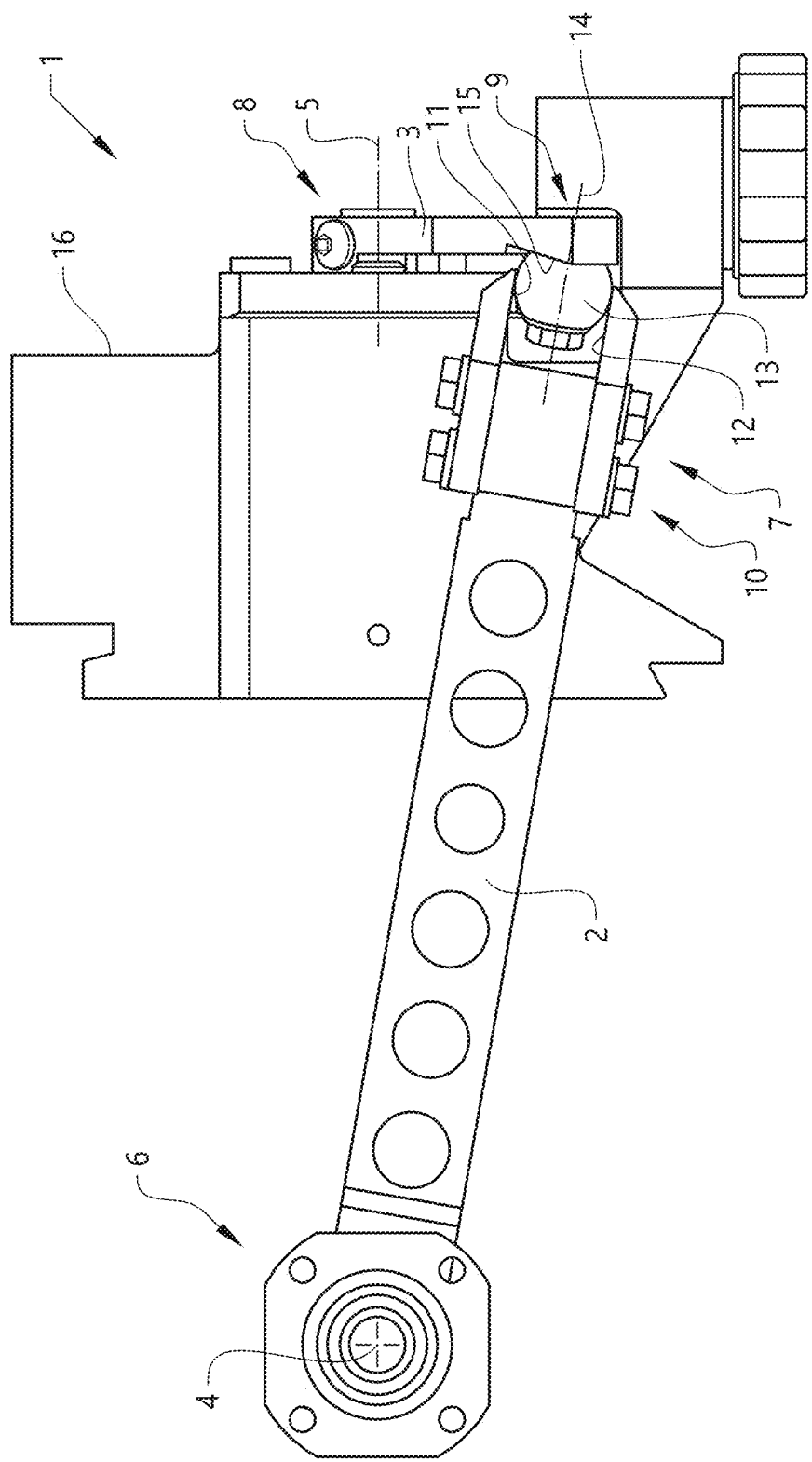
FIG. 2 shows a side view of a valve control device according to the invention.
Figure 3A:
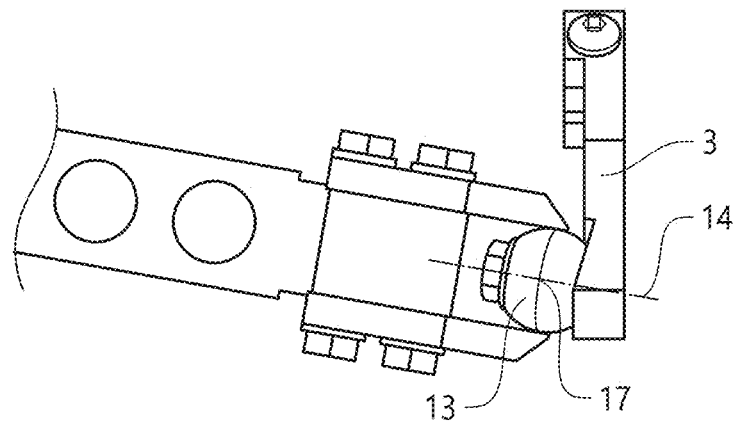
FIG. 3a-c show details of the valve control device according to the invention.
Figure 3B:
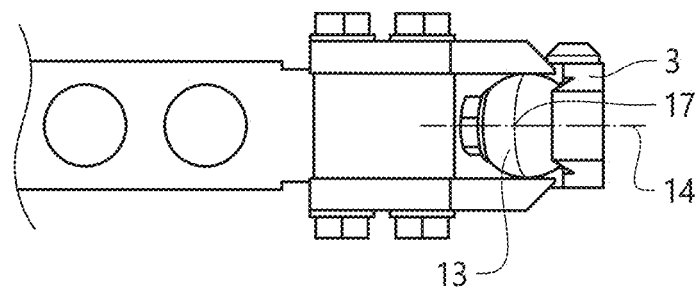
Figure 3C:
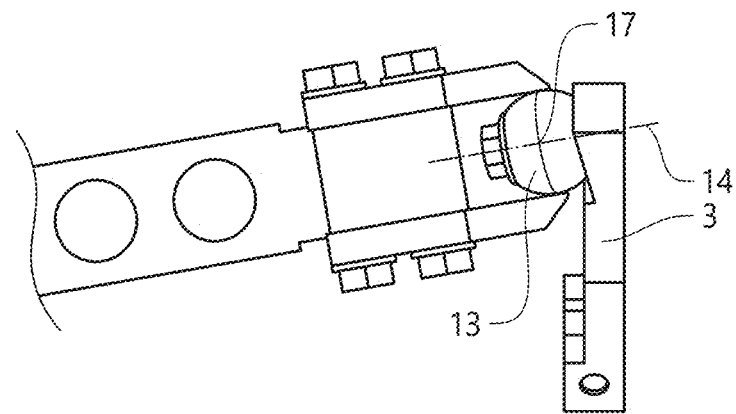
Figure 4:
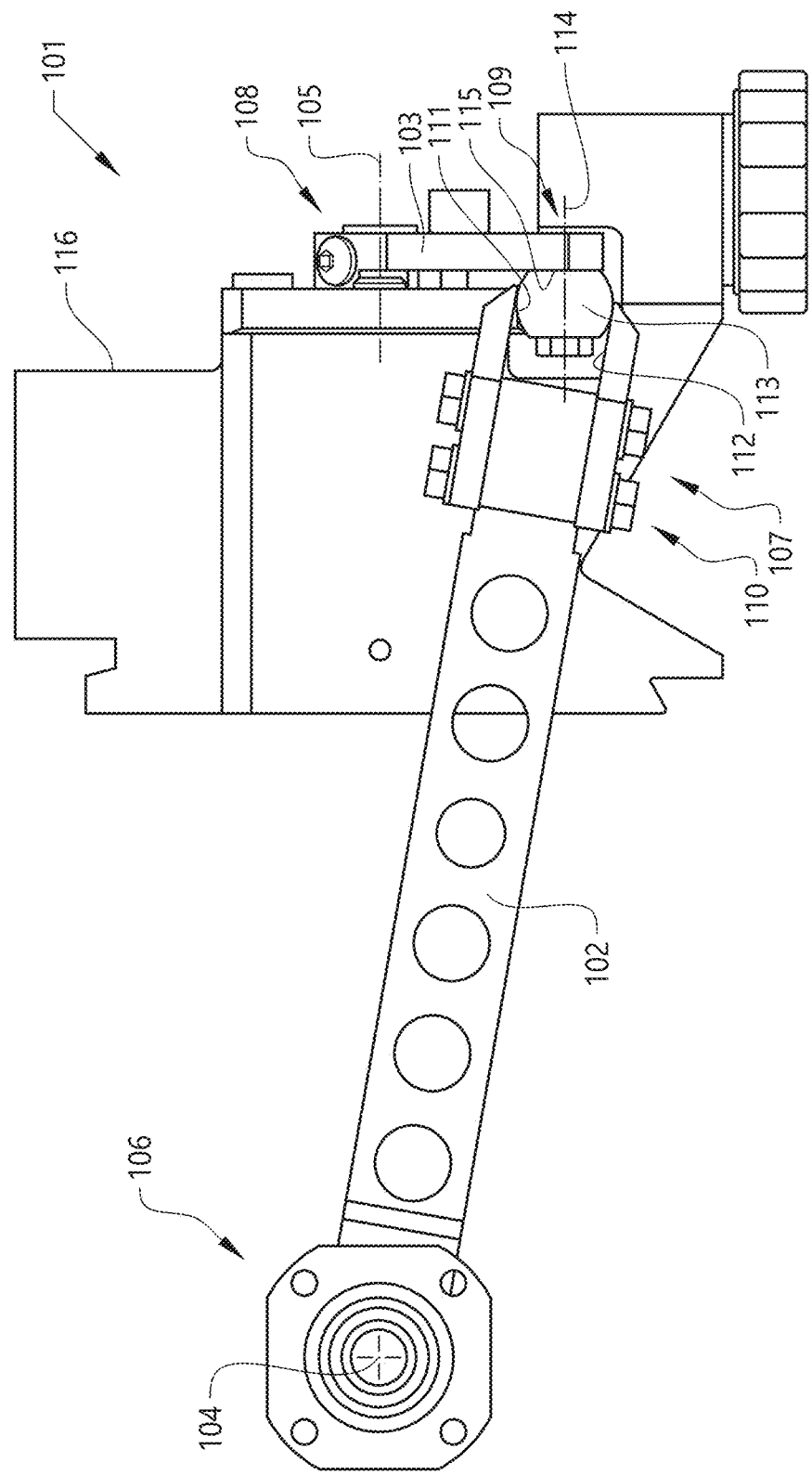
FIG. 4 shows a side view of a known valve control device.

FIGS. 1 to 3 show an inventive valve control device 1 according to the invention and FIGS. 4 and 5 show a known prior art valve control device 101.

The valve control device 1, shown in FIGS. 1 to 3, comprises a first control arm 2 that is attached to an actuator adapted to move the first control arm up and down. The first end 6 of the first control arm 2 is in this example mounted to an electric motor which rotates the first control arm 2 around a first axis 4. The movement of the first control arm opens and closes the valve 16, which controls a piston pump. The second end 7 of the first control arm 2 is provided with a fork 10 having an upper bearing surface 11 and a lower bearing surface 12. The fork 10 will cooperate with a rotatable member 13 attached to the second control arm 3. The fork 10 and the rotatable member 13 constitutes the interface between the first control arm 2 and the second control arm 3.

The second control arm 3 is attached to a valve member of the valve 16. The valve member is a rotatable valve member that will open and close a passage in the valve 16. A first end of the second control arm is attached to the valve member and can rotate around a second axis 5 such that the valve member opens and closes the passage. The second end 9 of the second control arm 3 is provided with a rotatable member 13, in the shown example a ball. The rotatable member may be any cylindrical element, such as a ball or a wheel. The rotatable member can rotate around a centre axis 14 of the rotatable member. The rotatable member is attached to the second control arm 3 on a mounting surface 15.

The mounting plane of the mounting surface 15 is angled with respect to a plane of the second control arm 3 that is perpendicular to the second rotational axis 5. The centre axis 14 is directed such that it is parallel to the upper bearing surface 11 and the lower bearing surface 12 of the fork 10. The rotatable member 13 is provided with a circular bearing surface 17 that is perpendicular to the centre axis 14. The circular bearing surface 17 is the bearing surface of the rotatable member having the largest diameter and that is perpendicular to the centre axis 14. By arranging the centre axis directed in this way, the circular bearing surface 17 of the rotatable member 13 will always be in contact with either the upper bearing surface 11 or the lower bearing surface 12 when the valve 16 is opened and closed.

FIG. 3a shows a view of the fork 10 and the rotatable member 13 in a lowermost position, where the valve is completely closed to the outlet but is open to the inlet. Here, the circular bearing surface 17 is perpendicular to the upper bearing surface 11 and the lower bearing surface 12, and the centre axis 14 is parallel to the upper bearing surface 11 and the lower bearing surface 12.

In FIG. 3b, the fork 10 and the rotatable member 13 is in an intermediate position, where the valve is closed to both the inlet and outlet. Here, the circular bearing surface 17 is perpendicular to the upper bearing surface 11 and the lower bearing surface 12, and the centre axis 14 is parallel to the upper bearing surface 11 and the lower bearing surface 12.

In FIG. 3c, the fork 10 and the rotatable member 13 is in an uppermost position, where the valve is completely opened to the outlet but closed to the inlet. Here, the circular bearing surface 17 is perpendicular to the upper bearing surface 11 and the lower bearing surface 12, and the centre axis 14 is parallel to the upper bearing surface 11 and the lower bearing surface 12. The centre axis 14 of the rotatable member 13 will be parallel to the upper bearing surface 11 and the lower bearing surface 12 of the fork 10 during the movement of the first control arm 2 relative to the second control arm 3.

Since both the first control arm and the second control arm are attached on rotational axles, the second end of each arm will move along a radius, which means that the contact point between the upper and lower bearing surfaces 11, 12 of the fork and the circular bearing surface 17 will move during the movement of the arms. The distance between the upper bearing surface 11 and the lower bearing surface 12 is slightly larger than the diameter of the rotatable member 13, such that only one of the bearing surfaces 11, 12 will be in contact with the circular bearing surface 17, depending on in which direction the arms move. This will at the same time allow the rotatable element to roll against the bearing surface of the fork instead of gliding against the bearing surface, which is the case when the circular bearing surface is not perpendicular to the bearing surfaces of the fork.

The contact point between the circular bearing surface 17 and the upper bearing surface 11 or the lower bearing surface 12 will move somewhat in a longitudinal direction with respect to the first rotational axis 4. However, since the rotatable member 13 can roll against the bearing surface of the fork, this longitudinal movement will be made in a rolling manner, and there will be no or a minimal gliding movement between the circular bearing surface 17 and the upper bearing surface 11 or the lower bearing surface 12.

The circular bearing surface 17 of the rotatable member 13 is always perpendicular to the center axis 14 of the rotatable member 13. However, this longitudinal movement may cause the rolling direction of the rotatable member 13 to deviate somewhat from a rolling direction that is perpendicular to the center axis 14. This deviation depends on the length and angular movement of the first control arm 2 and may be between zero degrees for one chosen length of the first control arm and up to a few degrees for another chosen control arm length with the same total movement of the rotatable member 13. Such a small deviation is acceptable and will allow the rotatable member 13 to rotate against the upper bearing surface 11 or the lower bearing surface 12 of the fork with a minimal wear.

A further advantage of mounting the rotatable member with the central axis being parallel with the upper bearing surface 11 and the lower bearing surface 12 is that the rotatable member 13 does not have to be a circular ball. Instead, a wheel can be used since the contact surface of the rotatable member will always be arranged in the same plane, perpendicular to the centre axis. The wheel may e.g. be provided with a thin rubber sleeve or tyre that will reduce vibrations and wear and that is easy to replace.

FIGS. 4 and 5 show an example of a known prior art valve control device 101. The valve control device 101 is similar to the inventive valve control device 1 apart from the interface between the first control arm and the second control arm. The valve control device 101 comprises a first control arm 102 that is attached to an actuator adapted to move the first control arm up and down. The first end 106 of the first control arm 102 rotates around a first axis 104. The second end 107 of the first control arm 102 is provided with a fork 110 having an upper bearing surface 111 and a lower bearing surface 112. The fork will cooperate with a ball member of the second control arm 103.

The second control arm 103 is attached to a valve member of the valve 116 at a first end 108 and rotates around a second axis 105, which will rotate a valve member to open and close a passage in the valve 116. The second end 109 of the second control arm 103 is provided with a rotatable member 113, in the shown example a ball. The ball can rotate around the centre axis 114 of the ball. The ball is attached to the second control arm 103 on a mounting surface 115.

In the known valve control device 101, the mounting plane of the mounting surface 115 is parallel with respect to a plane of the second control arm that is perpendicular to the second rotational axis 105. The centre axis 14 is thus perpendicular to the second control arm 103. By mounting the ball in this direction, the contact point between the bearing surface of the ball 113 and the upper bearing surface 111 and the lower bearing surface 112 will move along the surface of the ball when the control arms move up and down. This will cause the surface of the ball to glide against the contact surfaces of the fork, which will induce wear on the ball. The fork is made of metal and the ball is made of plastic. The wear will increase the tolerances of the valve, such that the ball must be replaced relatively often. The worn particles, especially small particles, will be airborne and may contaminate the product that is filled. This is a problem when filling e.g. medical products in a clean room, where airborne particles must be reduced to a minimum.

Figure 5A:
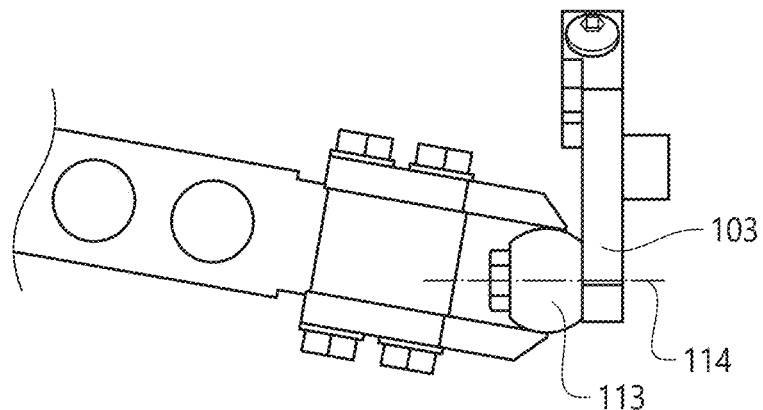
FIG. 5a-c show details of the valve control device of FIG. 4.
Figure 5B:
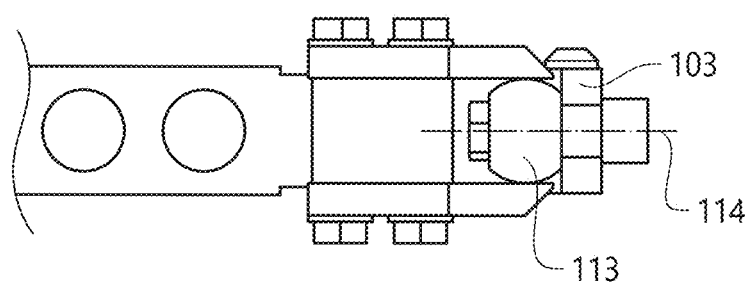
Figure 5C:
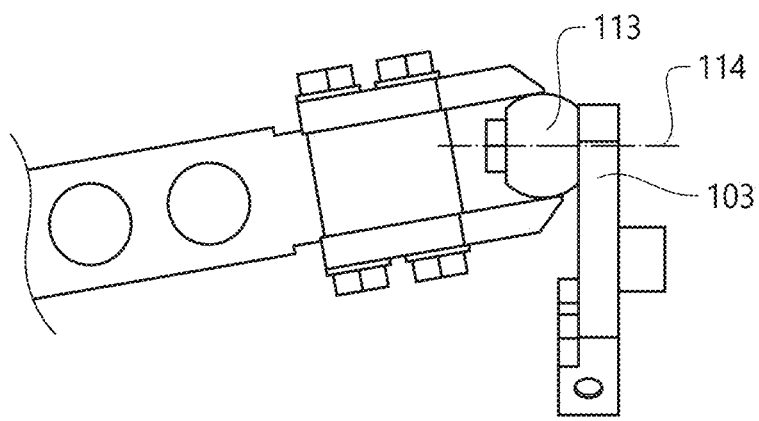

In FIG. 5*a*, the fork 110 and the ball 113 is positioned in a lowermost position, where the valve is completely closed to the outlet but is open to the inlet. In FIG. 5*b*, the fork 110 and the ball 113 is in an intermediate position, where the valve is closed to both the inlet and outlet. In FIG. 5*c*, the fork 110 and the ball 113 is in an uppermost position, where the valve is completely opened to the outlet but closed to the inlet. As can be seen in the figures, the contact point between the upper and lower bearing surfaces 111, 112 of the fork 110 and the ball 113 changes depending on the position of the control arms. The ball will thus not be able to roll against the bearing surfaces, but will instead glide.

The invention is not to be regarded as being limited to the embodiments described above, a number of additional variants and modifications being possible within the scope of the subsequent patent claims.

REFERENCE SIGNS

1: Valve control device
2: First control arm
3: Second control arm
4: First axis
5: Second axis
6: First end of first control arm
7: Second end of first control arm
8: First end of second control arm
9: Second end of second control arm
10: Fork
11: Upper bearing surface
12: Lower bearing surface
13: Rotatable member
14: Centre axis
15: Mounting surface
16: Valve
17: Circular bearing surface 101: Valve control device
102: First control arm
103: Second control arm
104: First axis
105: Second axis
106: First end of first control arm
107: Second end of first control arm
108: First end of second control arm
109: Second end of second control arm
110: Fork
111: Upper bearing surface
112: Lower bearing surface
113: Rotatable member
114: Centre axis
115: Mounting surface
116: Valve

What is claimed is:

1. A valve control device for controlling the opening and closing of a valve, comprising a first control arm and a second control arm, wherein the first control arm is arranged to rotate around a first axis at a first end, wherein the second control arm is arranged to rotate around a second axis at a first end, wherein the first axis is perpendicular to the second axis, wherein a second end of the first control arm is provided with a fork having an upper bearing surface and a lower bearing surface, wherein a second end of the second control arm is provided with a rotatable member, wherein the rotatable member is rotatable around a centre axis, and wherein the rotatable member is attached to the second control arm-on a mounting surface, wherein a plane of the mounting surface is angled with respect to a plane of the second control arm that is perpendicular to the second rotational axis such that the centre axis of the rotatable member is parallel to the upper bearing surface and the lower bearing surface of the fork during movement of the first control arm relative to the second control arm.

2. The valve control device according to claim 1, wherein the rotatable member is a ball.

3. The valve control device according to claim 1, wherein the rotatable member is a wheel.

4. The valve control device according to claim 1, wherein the rotatable member is mounted on a roller bearing.

5. The valve control device according to claim 1, wherein the rotatable member is mounted on a sliding bearing.

6. The valve control device according to claim 1, wherein the first axis and the second axis are arranged in the same plane.

7. A tube filling machine comprising at least one valve control device according to claim 1.

* * * * *